United States Patent
Boyle

(10) Patent No.: US 9,586,151 B1
(45) Date of Patent: Mar. 7, 2017

(54) SYSTEM AND METHOD FOR A MOVING PUZZLE THEATER

(71) Applicant: Universal City Studios LLC, Universal City, CA (US)

(72) Inventor: Patrick Devin Boyle, Orlando, FL (US)

(73) Assignee: Universal City Studios LLC, Universal City, CA (US)

( * ) Notice: Subject to any disclaimer, the term of this patent is extended or adjusted under 35 U.S.C. 154(b) by 0 days.

(21) Appl. No.: 14/875,309

(22) Filed: Oct. 5, 2015

(51) Int. Cl.
| | |
|---|---|
| *A63J 5/02* | (2006.01) |
| *A63G 31/02* | (2006.01) |
| *A47C 1/12* | (2006.01) |
| *A47C 1/121* | (2006.01) |
| *A63J 5/12* | (2006.01) |
| *E04H 3/30* | (2006.01) |
| *G05B 15/02* | (2006.01) |

(52) U.S. Cl.
CPC ............... *A63G 31/02* (2013.01); *A47C 1/12* (2013.01); *A47C 1/121* (2013.01); *A63J 5/12* (2013.01); *E04H 3/30* (2013.01); *G05B 15/02* (2013.01)

(58) Field of Classification Search
CPC ... A63G 1/00; A63G 1/10; A63G 1/28; A63G 7/00; A63G 31/00; A63G 31/16; E04H 3/00; E04H 3/12
USPC .................. 472/59, 75–77, 98, 107; 52/8–10
See application file for complete search history.

(56) References Cited

U.S. PATENT DOCUMENTS

| | | | |
|---|---|---|---|
| 706,891 A | 8/1902 | Bramhall | |
| 3,394,505 A | 7/1968 | Rife | |
| 4,688,357 A * | 8/1987 | Deaton | E04H 3/12 52/745.2 |
| 5,794,383 A * | 8/1998 | Labinski | E04H 3/12 52/10 |
| 7,854,660 B2 | 12/2010 | Crawford et al. | |
| 8,162,768 B2 | 4/2012 | Nemeth et al. | |
| 8,303,426 B2 * | 11/2012 | Crawford | A63G 1/10 472/130 |
| 8,317,632 B2 | 11/2012 | Nemeth et al. | |
| 8,375,863 B2 * | 2/2013 | Roodenburg | A63G 7/00 104/53 |
| 8,388,458 B2 * | 3/2013 | Buhler | A63G 1/10 472/130 |
| 8,480,501 B2 | 7/2013 | Nemeth et al. | |
| 8,864,592 B2 | 10/2014 | Baxter et al. | |

* cited by examiner

*Primary Examiner* — Kien Nguyen
(74) *Attorney, Agent, or Firm* — Fletcher Yoder, P.C.

(57) ABSTRACT

In one embodiment, a theater ride system includes a processor, a center platform, actuation arms, and maneuverable seating areas. Each maneuverable seating area of at least a first subset of the maneuverable seating areas is coupled to a respective portion of the center platform via a respective actuator arm of the actuation arms. The processor is configured to control the actuator arms to position the maneuverable seating areas in a uniform theater configuration such that each of the maneuverable seating areas is adjacent to at least one other of the maneuverable seating areas and the center platform to resemble stationary seating sections of a theater at a beginning of a show, move the maneuverable seating areas into different configurations during the show, and position the maneuverable seating areas in the uniform theater configuration near an end of the show.

21 Claims, 13 Drawing Sheets

SYSTEM AND METHOD FOR A MOVING PUZZLE THEATER

BACKGROUND

Theaters used for shows in amusement parks, carnivals, and the like, generally include areas designated for seating of patrons and areas designated for performances of actors/participants in the shows. These areas are generally in fixed positions and it is now recognized that the fixed nature of the seating in such theatres provides patrons with limited views and limited interaction with aspects of related shows.

BRIEF DESCRIPTION

Certain embodiments commensurate in scope with the originally claimed subject matter are summarized below. These embodiments are not intended to limit the scope of the disclosure, but rather these embodiments are intended only to provide a brief summary of certain disclosed embodiments. Indeed, the present disclosure may encompass a variety of forms that may be similar to or different from the embodiments set forth below.

In one embodiment, a theater ride system includes a processor, a center platform, a plurality of actuation arms, and a plurality of maneuverable seating areas. Each maneuverable seating area of at least a first subset of the plurality of maneuverable seating areas is coupled to a respective portion of the center platform via a respective actuator arm of the plurality of actuation arms. The processor is configured to control the actuator arms to position the plurality of maneuverable seating areas in a uniform theater configuration such that each of the plurality of maneuverable seating areas is adjacent to at least one other of the plurality of maneuverable seating areas and the center platform to resemble stationary seating sections of a theater at a beginning of a show, move the plurality of maneuverable seating areas into different configurations during the show, and position the plurality of maneuverable seating areas in the uniform theater configuration near an end of the show.

In one embodiment, a theater ride system includes a processor, a plurality of maneuverable seating areas, and a center platform including a plurality of actuator arms each coupled to a respective maneuverable seating area of the plurality of maneuverable seating areas and the center platform. The processor is configured to direct the system to position, via the plurality of actuator arms, the maneuverable seating areas in a uniform theater configuration adjacent to at least one other maneuverable seating area and the center platform to resemble stationary seating sections of a theater at a beginning of a show, move, via the plurality of actuator arms, the maneuverable seating areas into different configurations during the show, and position, via the plurality of actuator arms, the maneuverable seating areas in the uniform theater configuration near an end of the show.

In one embodiment, a hexagon shaped puzzle theater system includes a processor, a plurality of maneuverable seating areas, a first center platform, a first plurality of actuator arms each coupled to a respective maneuverable seating area of a first subset of the plurality of maneuverable seating areas and the first center platform, a second center platform, a second plurality of actuator arms each coupled to a respective maneuverable seating area of a second subset of the plurality of maneuverable seating areas and the second center platform. The first center platform is disposed on top of the second center platform, and the processor is configured to direct the system to position, via the first and second pluralities of actuator arms, the plurality of maneuverable seating areas in a uniform theater configuration such that each of the plurality of maneuverable seating areas is adjacent to at least one other of the plurality of maneuverable seating areas and the first center platform to resemble stationary seating sections of a theater at a beginning of a show. The processor is also configured to move, via the first and second pluralities of actuator arms, the plurality of maneuverable seating areas into different configurations during the show, and to position, via the first and second pluralities of actuator arms, the maneuverable seating areas in the uniform theater configuration near an end of the show.

DRAWINGS

These and other features, aspects, and advantages of the present disclosure will become better understood when the following detailed description is read with reference to the accompanying drawings in which like characters represent like parts throughout the drawings, wherein:

FIGS. 1-4 include a set of schematic diagrams of embodiments of different shaped uniform puzzle theater systems that include maneuverable seating areas disposed around a center platform, in accordance with the present disclosure;

Figure 6:
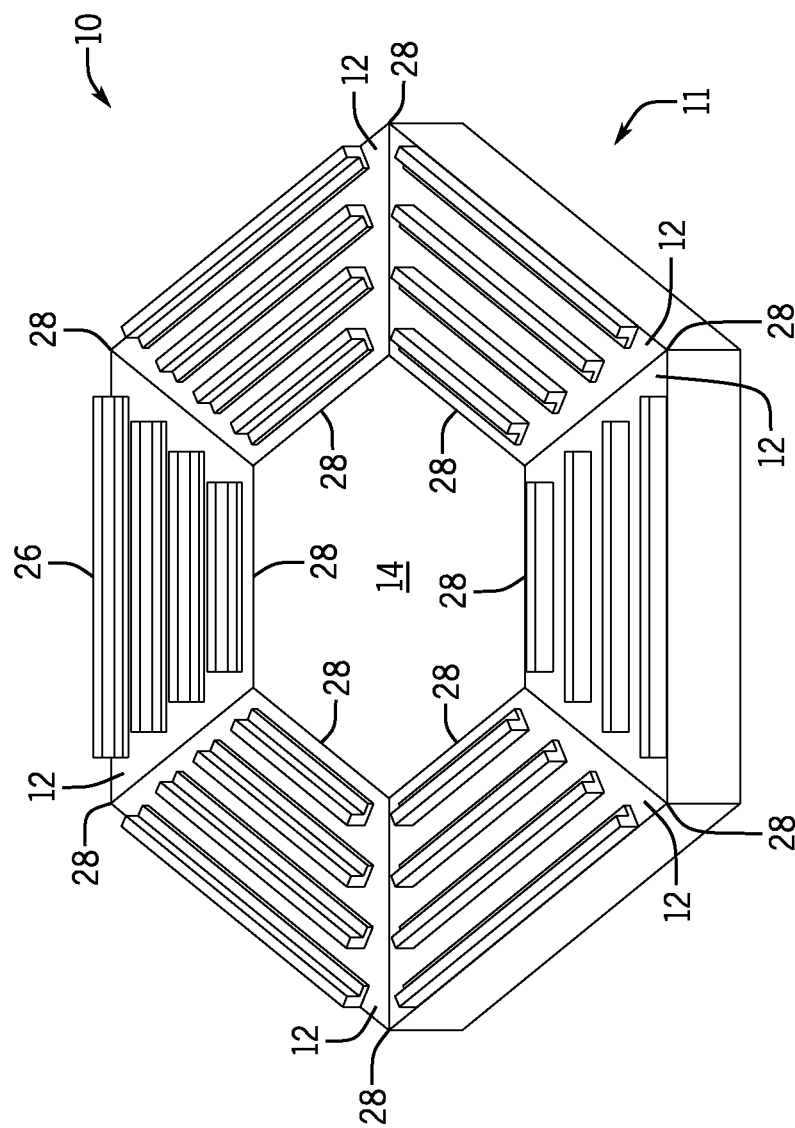
FIG. 6 is a perspective view of an embodiment of a hexagon puzzle theater system in a uniform theater configuration, in accordance with the present disclosure.
Figure 7:
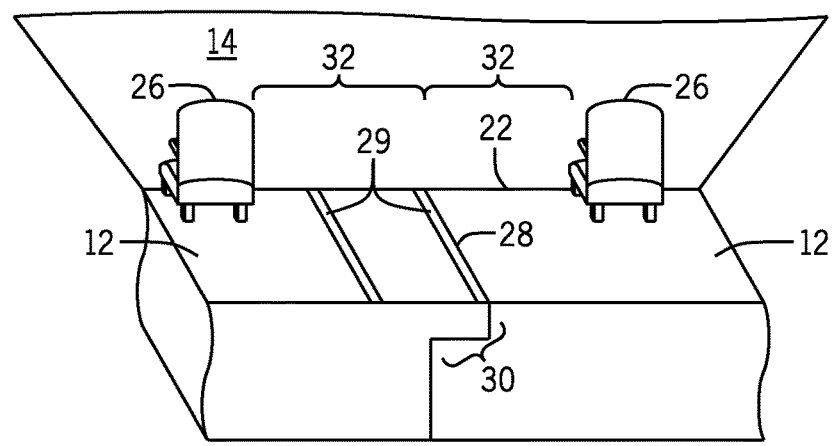
Figure 8:
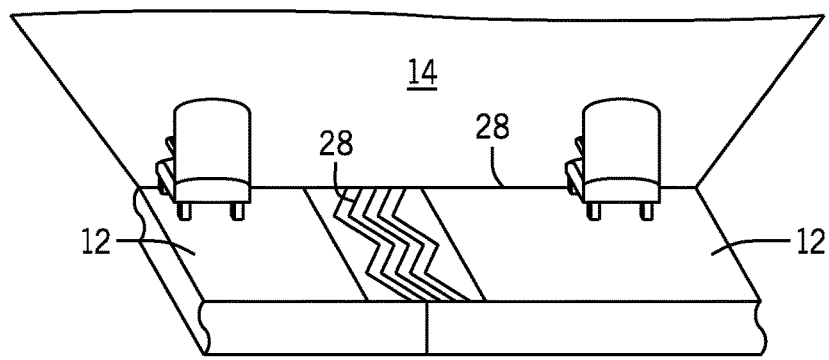
Figure 9:
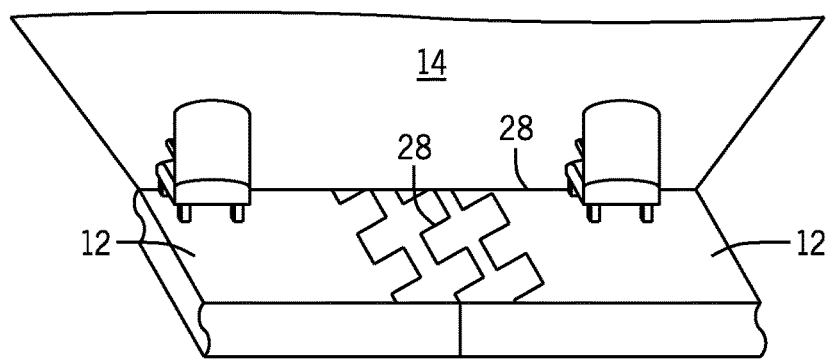
Figure 10:
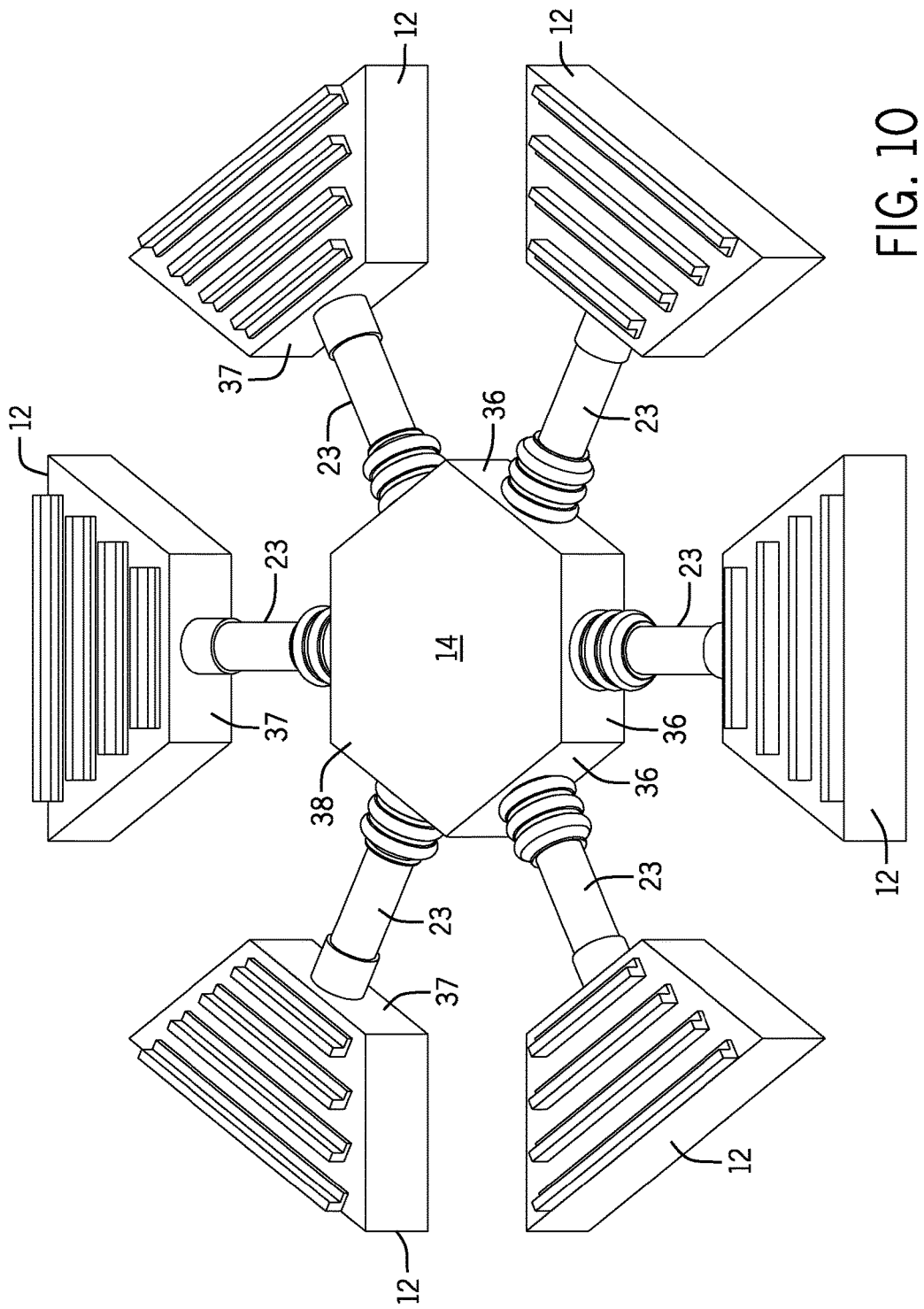
Figure 11:
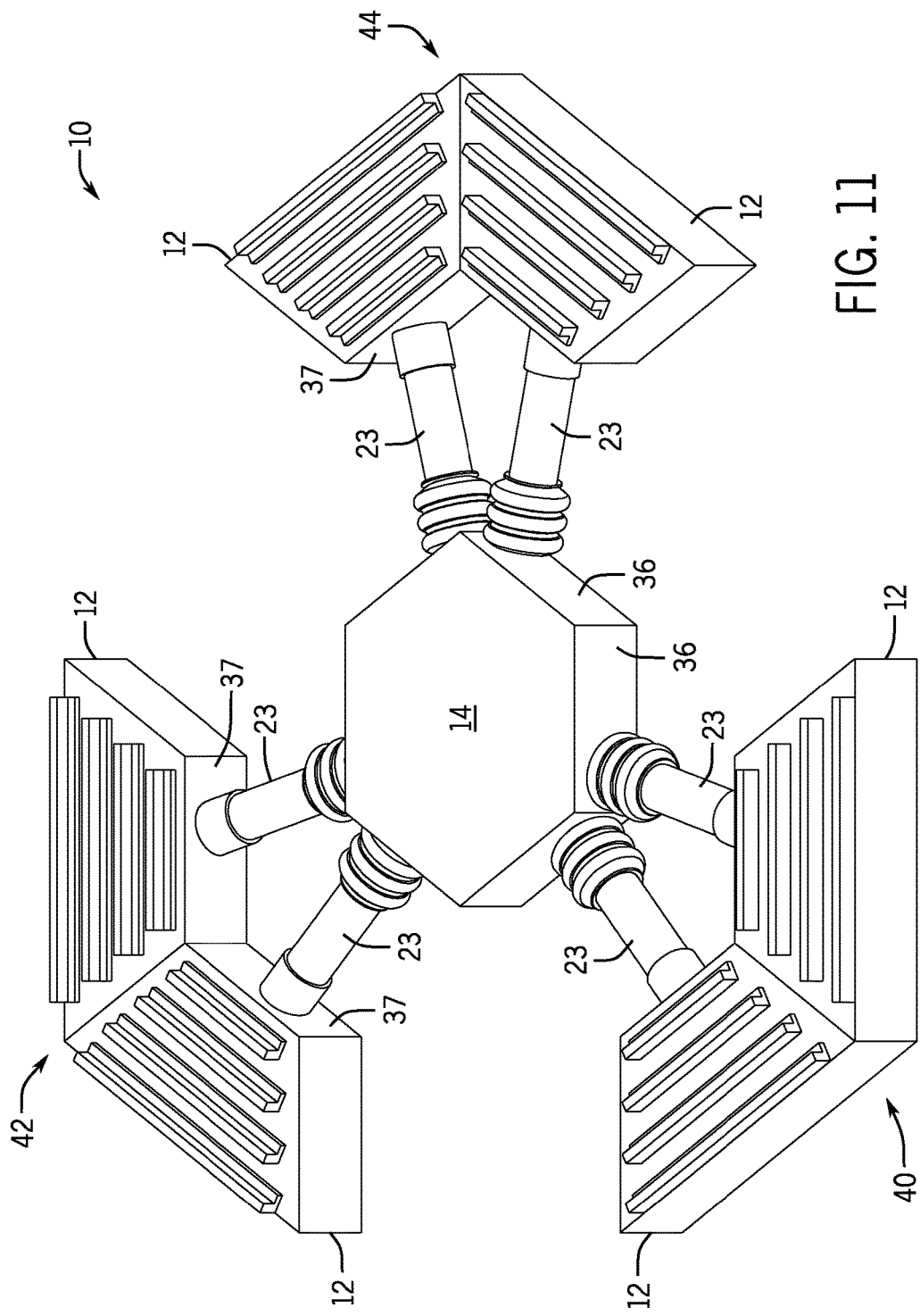
Figure 12:
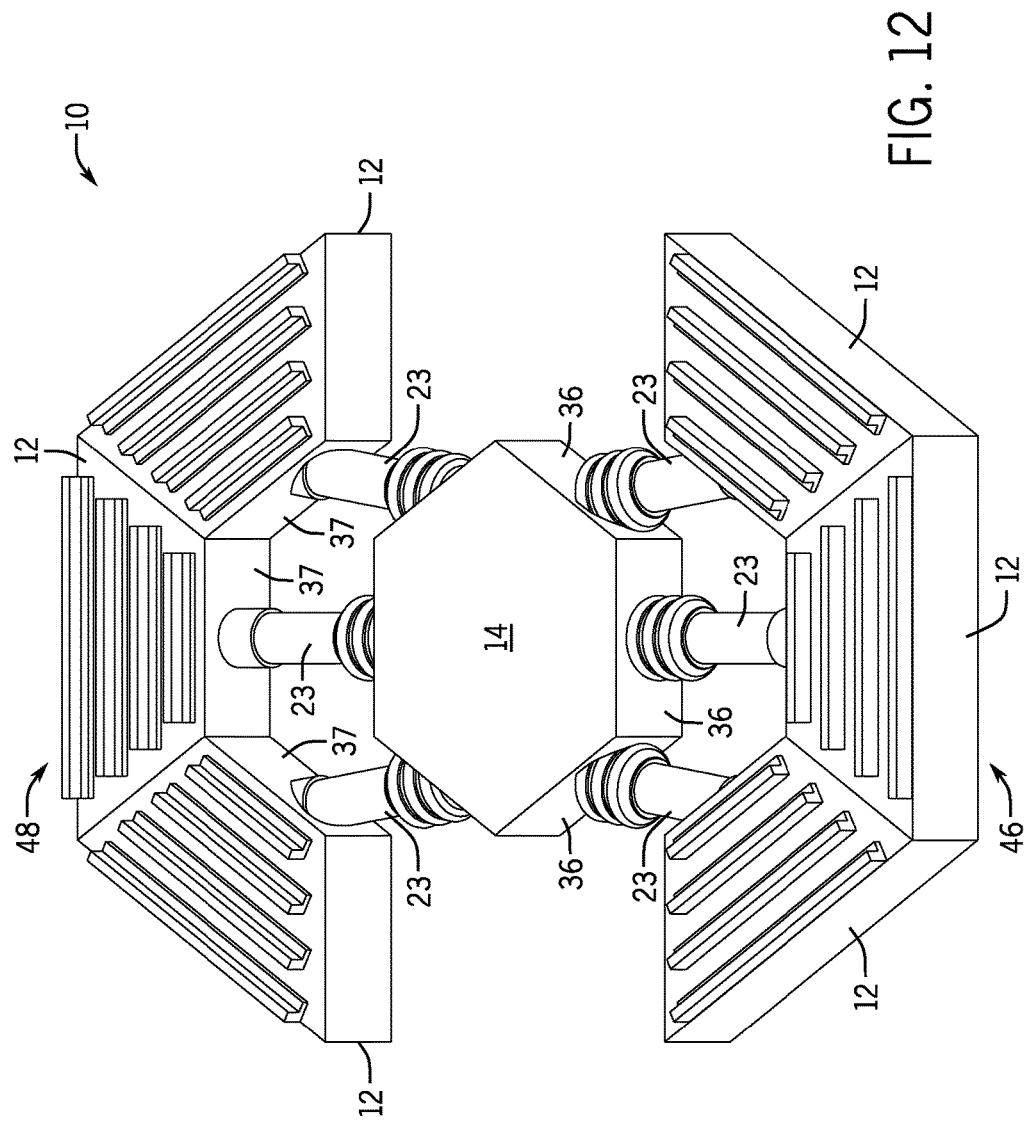
Figure 13:
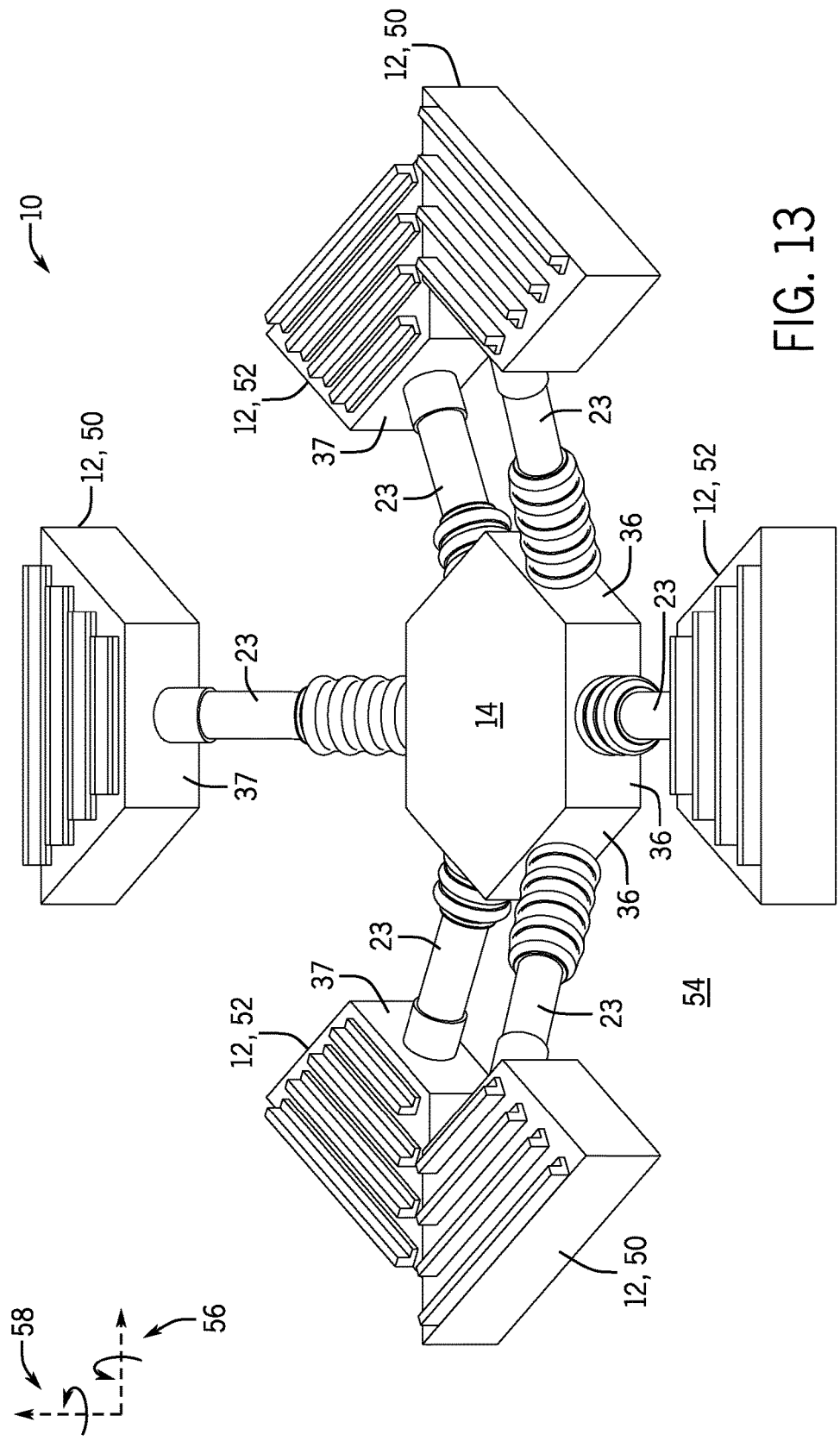
Figure 14:
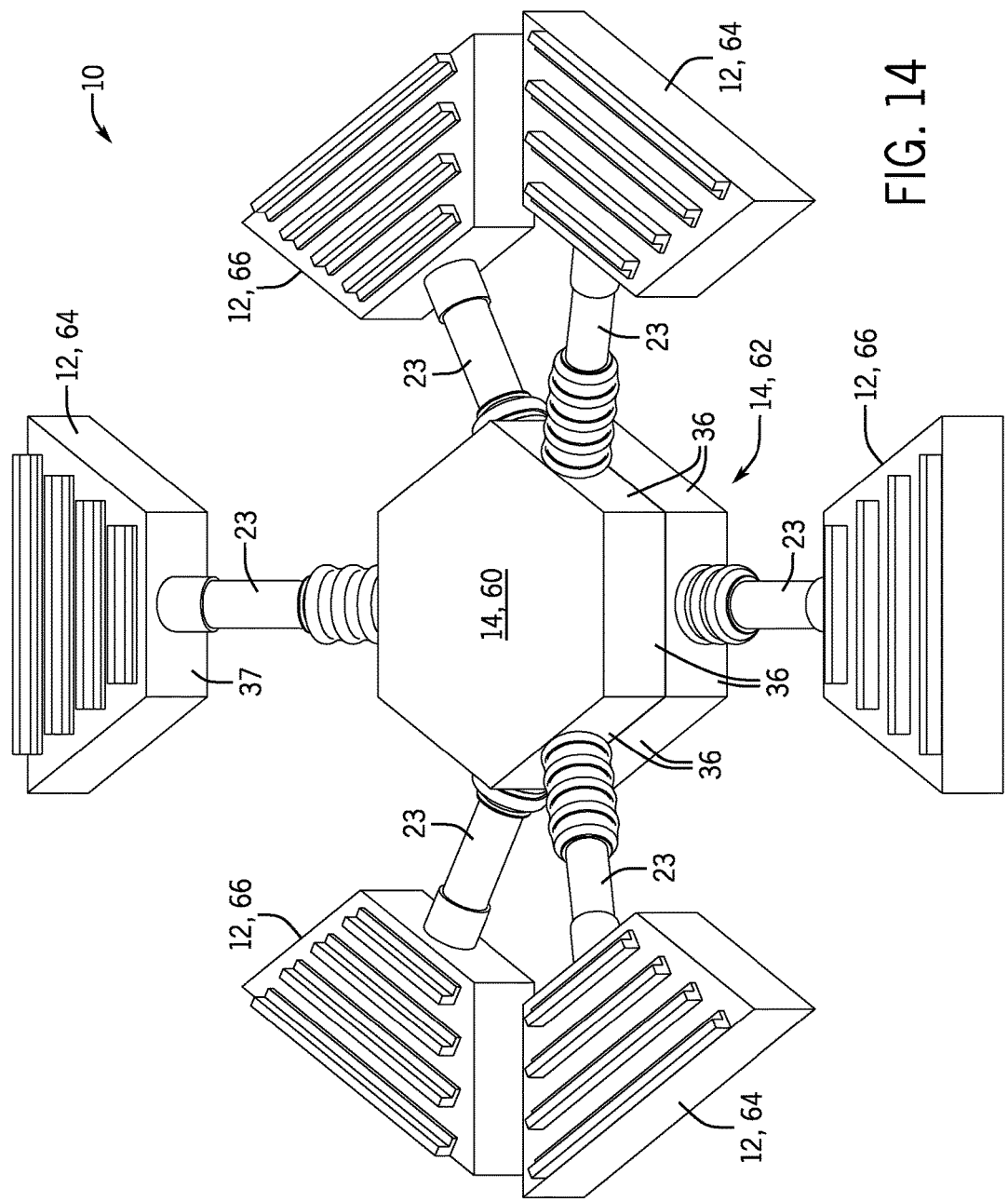
Figure 15:
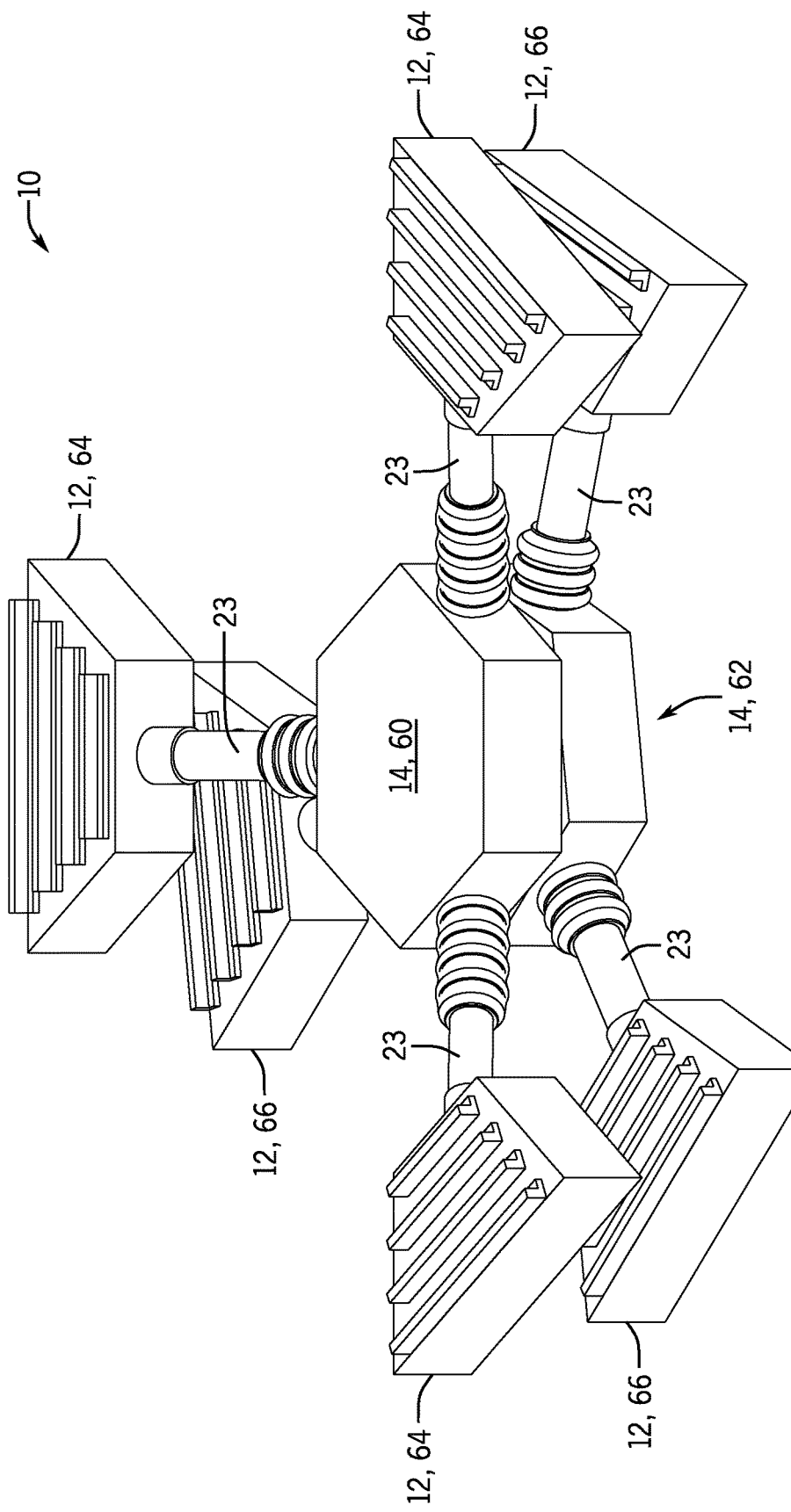
Figure 16:
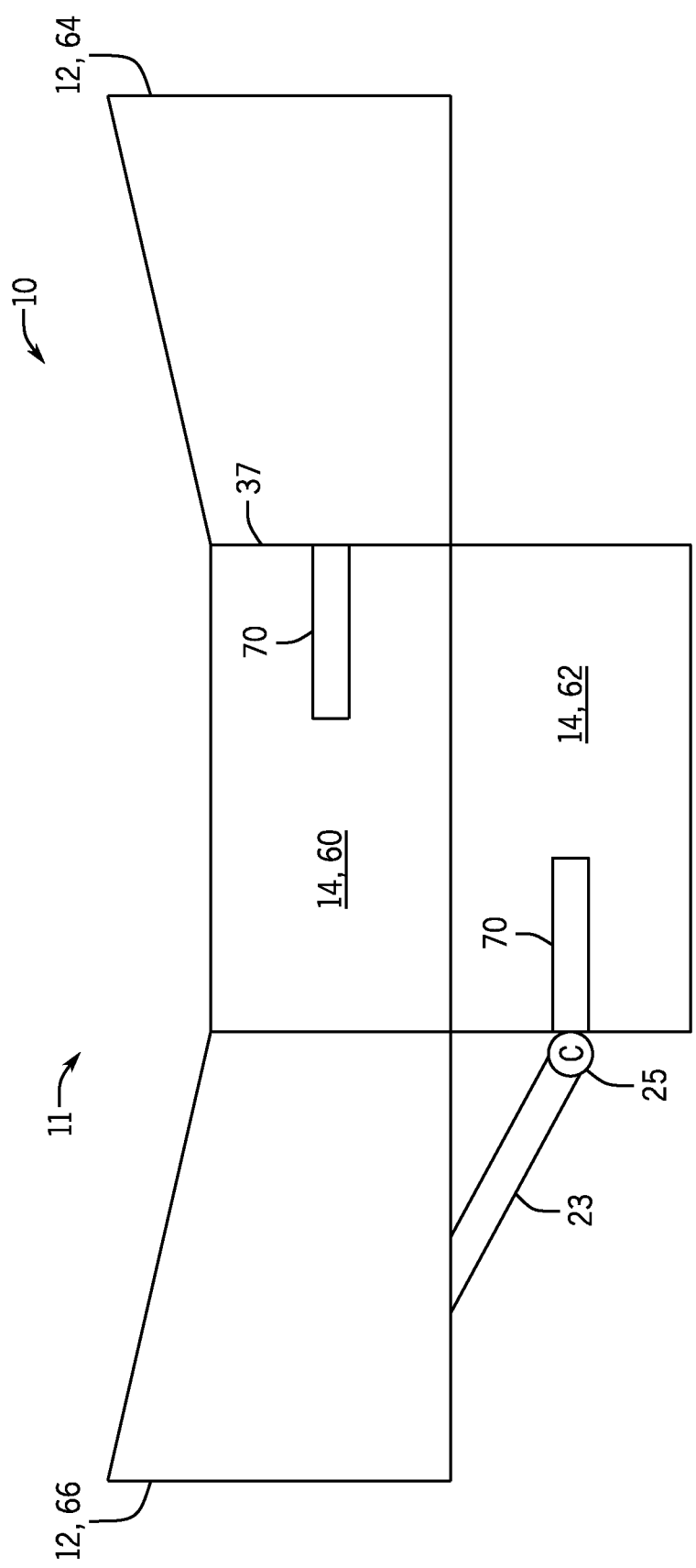
Figure 17:
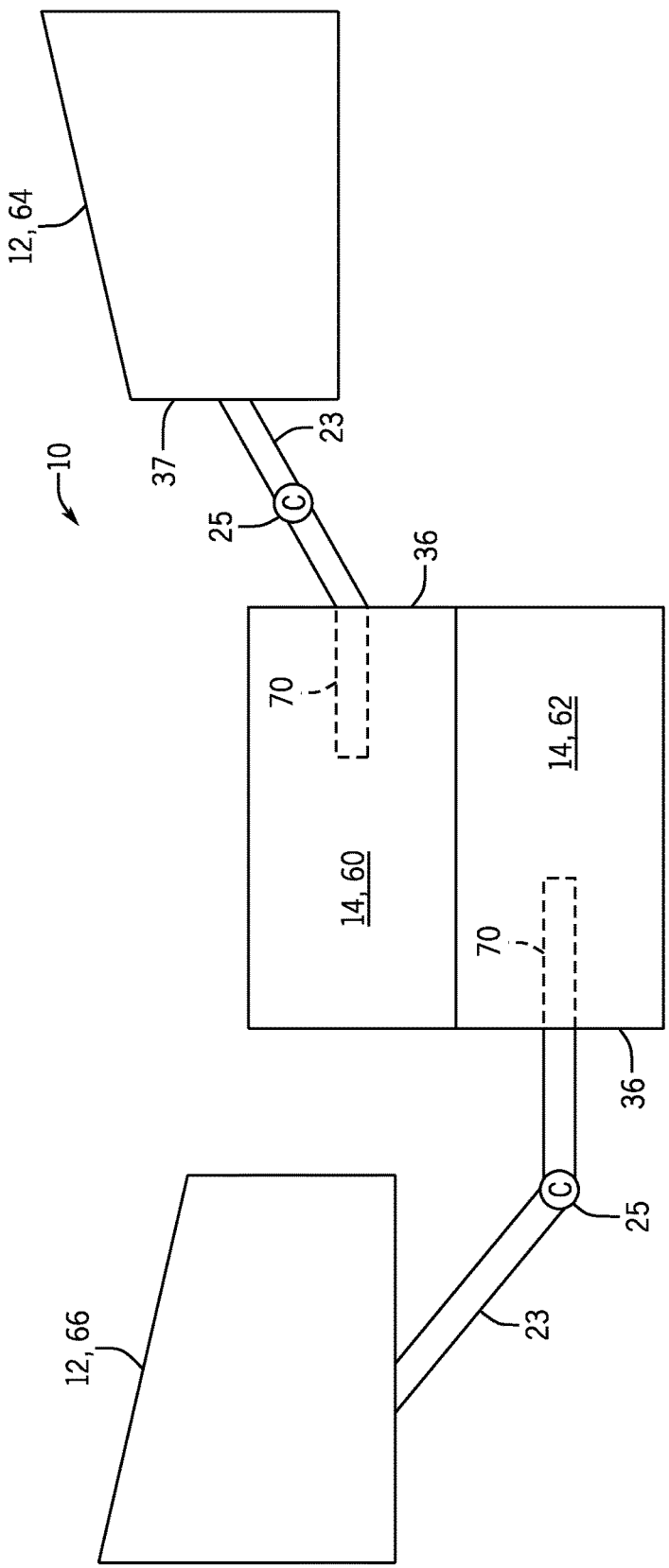
Figure 18:
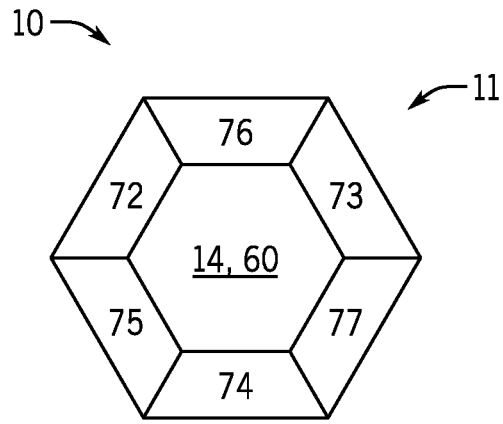
Figure 19:
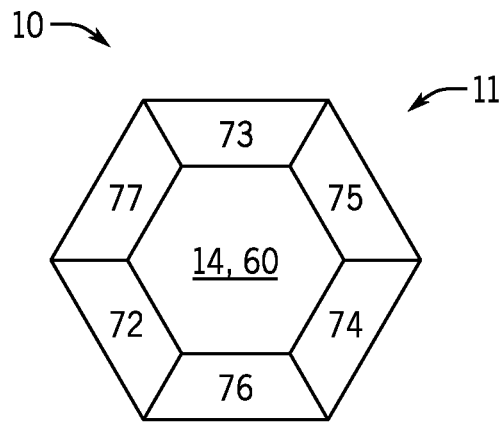
Figure 20:
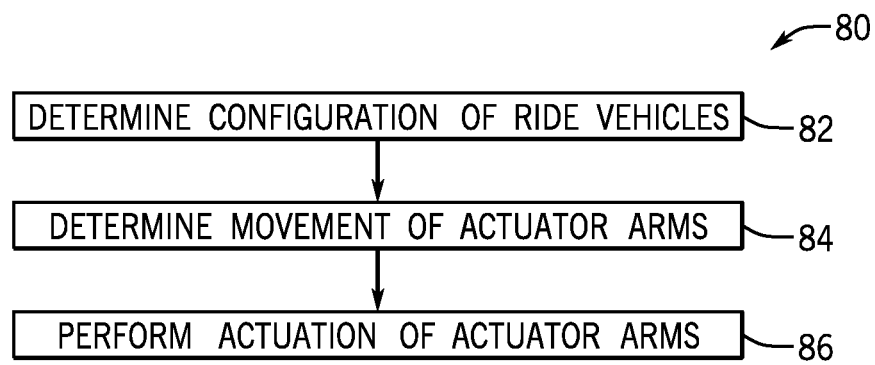

FIGS. 7-9 include a set of perspective views of embodiments that provide concealment of a breakaway zone between the maneuverable seating areas, in accordance with the present disclosure;

FIG. 10 is a perspective view of an embodiment of the hexagon puzzle theater system of FIG. 6 in a fully separated configuration with actuator arms extended, in accordance with the present disclosure;

FIG. 11 is a perspective view of an embodiment of the hexagon puzzle theater system of FIG. 6 in a partially separated configuration with the actuator arms extended and the maneuverable seating areas positioned in an arrangement of thirds, in accordance with the present disclosure;

FIG. 12 is a perspective view of an embodiment of the hexagon puzzle theater system of FIG. 6 in a partially separated configuration with the maneuverable seating areas positioned in an arrangement of halves, in accordance with the present disclosure;

FIG. 13 is a perspective view of an embodiment of the hexagon puzzle theater system of FIG. 6 in a fully separated configuration with some of the maneuverable seating areas raised, in accordance with the present disclosure;

FIG. 14 is a perspective view of an embodiment of the hexagon puzzle system of FIG. 6 including two center platforms, in accordance with the present disclosure;

FIG. 15 is a perspective view of an embodiment of the hexagon puzzle theater system including the two center platforms of FIG. 14 illustrating some of the maneuverable seating areas passing over one another, in accordance with the present disclosure;

FIG. 16 is a side view of an embodiment of the hexagon puzzle theater system including the two center rotating platforms of FIG. 14 illustrating the maneuverable seating areas flush with the top center platform in a uniform theater configuration, in accordance with the present disclosure;

FIG. 17 is a side view of an embodiment of the hexagon puzzle theater system including the two center rotating platforms of FIG. 14 illustrating a separated configuration with the actuator arms extended, in accordance with the present disclosure;

FIG. 18 illustrates the maneuverable seating areas each in a first physical location in a first uniform theater configuration at the start of a show in accordance with the present disclosure;

FIG. 19 illustrates the maneuverable seating areas each in a second physical location and each adjacent to at least one different maneuverable seating area relative to the first uniform theater configuration in a second uniform theater configuration at the end of the show, in accordance with the present disclosure; and FIG. 20 is a flow diagram of an embodiment of a process suitable for configuring movement and arrangement of the maneuverable seating areas during a show, in accordance with the present disclosure.

DETAILED DESCRIPTION

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Presently disclosed embodiments are directed to systems and methods for a moving puzzle theater system. The embodiments may enable an exciting and different kind of theatrical immersion by combining elements of a ride system within the context of a theater show (e.g., a theater ride system). For example, in some embodiments, at the beginning of a show, the puzzle theater system may appear as a typical uniform theater including one or more seating sections and performance sections. That is, the seating sections may be essentially seamlessly arranged next to each other around a center platform in a way that they appear as one uniform seating section. In other words, patrons may get the impression that they are entering one completely integral and unified theater, when in fact each seating section is a separate maneuverable seating area capable of movement relative to the others. Indeed, based on the way the maneuverable seating area modules are arranged, the patrons may not even realize that the puzzle theater system is enabled to separate and move the maneuverable seating areas. The term "puzzle theater system" may generally refer to the theater's ability for pieces (e.g., maneuverable seating areas) to be separated from an initial configuration, while remaining connected as a single system, and put back together in a final configuration that may be the same as or different from the initial configuration. The puzzle theater system may also be operated as a puzzle that must be solved by a group of participants (e.g., all or a subset of the audience) to achieve one or more goals throughout the progress of a show being performed.

As the show progresses, the seating sections may be revealed to be moving maneuverable seating areas and the maneuverable seating areas may be actuated in coordination with one another in sync with a story or show elements presented in the show on the center platform, based on patron input, or both. In some embodiments, the puzzle theater system may include a single machine with one or more center platforms and actuator arms connecting the center platform to respective maneuverable seating areas. The actuator arms may be controlled to separate the maneuverable seating areas, extend and/or retract the maneuverable seating areas (e.g., telescoping) from the center platform, rearrange the maneuverable seating areas into various clusters, raise and/or lower the maneuverable seating areas, tilt the maneuverable seating areas, and the like. In other words, the actuator arms may enable moving the maneuverable seating areas with six degrees of freedom (e.g., roll, pitch, yaw, surge, heave, and sway). In addition, the one or more center platforms may be configured to rotate (e.g., to enable some maneuverable seating areas to pass over one another during the course of the show) or the actuator arms, which may be extending from the center platforms, may be configured to extend the attached maneuverable seating areas over one another by actuation of the arms.

Further, in some embodiments, the one or more center platforms may be electronically and communicatively coupled to each of the respective maneuverable seating areas. That is, center platform circuitry (e.g., control and communication circuitry) may enable the center platforms to control the actuator arms to move the maneuverable seating areas as desired. For example, each of the one or more center platforms may include an automation controller (e.g., a programmable logic controller) and this controller may coordinate with other controllers of other center platforms (e.g., designating a primary controller and subservient secondary controllers) to achieve coordinated motion of the maneuverable seating areas. It should be noted that, in some embodiments, a single controller may be used to control the maneuverable seating areas regardless of the number of center platforms. In some embodiments, each individual maneuverable seating area may include its own maneuverable seating area circuitry (e.g., control and communication circuitry) that enables performing actions in coordination with other maneuverable seating areas, as instructed. Further, in some embodiments, the maneuverable seating areas may include one or more sensors that provide data used to control the movement of the maneuverable seating areas. For example, a proximity sensor may enable controlling the maneuverable seating areas movement so the maneuverable seating areas do not undesirably contact one another.

As may be appreciated, seamlessly arranged maneuverable seating areas that appear as a single seating section of a theater, which are further enabled to unexpectedly split apart and move, may enhance a patron's experience by providing surprise and more than one experience depending on where the patron is initially sitting. As a result, a patron may be encouraged to attend the "show" again to obtain a different experience by sitting in a different seating section (e.g., maneuverable seating area) that moves in ways unique to that seating section. Further, moving patron-occupied maneuverable seating areas during the course of a show may provide different points-of-views for the patrons, thereby potentially enhancing the experience of the show.

Figure 1:
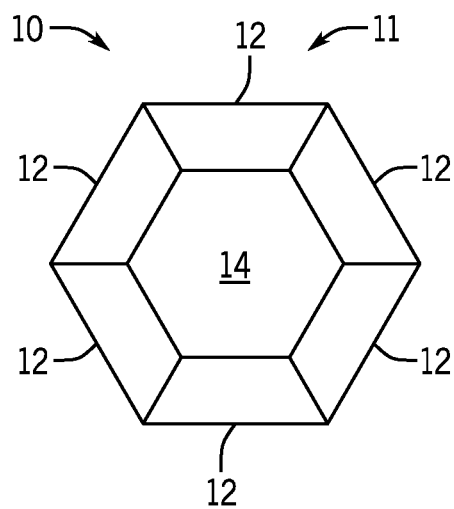
Figure 2:
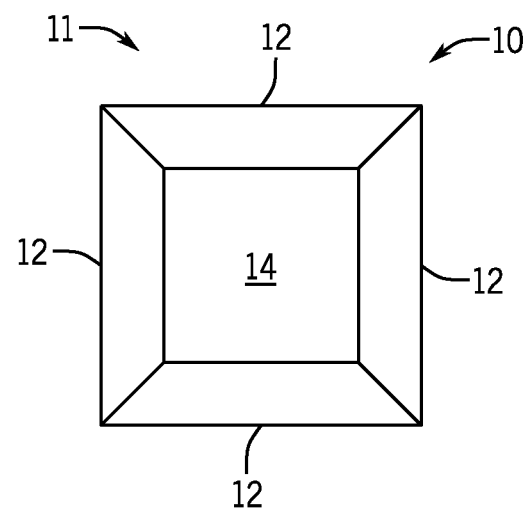
Figure 3:
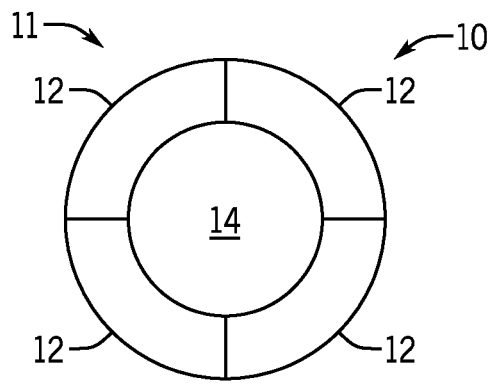
Figure 4:
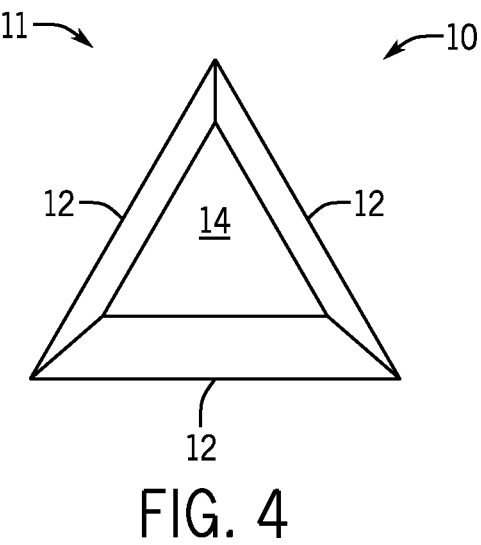

Turning first to FIGS. 1-4, a set of schematic diagrams of embodiments of different shaped puzzle theater systems 10 set in uniform theater configurations 11 that include numerous maneuverable seating areas 12 disposed around (e.g., surrounding) a center platform 14 (e.g., a stage area for a theatrical presentation or show) are displayed, in accordance with the present disclosure. It should be understood that "uniform theater configuration" may refer to when the puzzle theater system 10 appears as an integrated and unified theater, which may include the maneuverable seating areas 12 being flush against the center platform 14 and immediately adjacent to each other. The various puzzle theater systems 10 shown generally vary by shape, in addition to the number of maneuverable seating areas 12 used, in some embodiments. As depicted, FIG. 1 illustrates the uniform puzzle theater system 10 in the shape of a hexagon, FIG. 2 illustrates the uniform puzzle theater system 10 in the shape of a square, FIG. 3 illustrates the uniform puzzle theater system 10 in the shape of a circle, and FIG. 4 illustrates the uniform puzzle theater system 10 in the shape of a triangle. It should be understood that the puzzle theater system 10 may be designed in any suitable shape based on one or more factors, such as the type of show to be performed in the puzzle theater system 10, space constraints of a structure including the puzzle theater system 10, engineer/designer/architect preference, and so forth.

The puzzle theater system 10 may be in the uniform theater configuration 11 at various times throughout the show. For example, the puzzle theater system 10 may initially be set in the uniform theater configuration 11 prior to a show starts so that when patrons enter the puzzle theater system 10, the patrons may perceive the puzzle theater system 10 as a typical theater where the seating sections (e.g., maneuverable seating areas 12) and the center platform 14 are stationary. During the show, the maneuverable seating areas 12 may be unexpectedly moved in various ways (e.g., extended away from the center platform 14, tilted, raised/lowered, arranged into clusters) via actuator arms. Then, the actuator arms of the puzzle theater system 10 may reconfigure the respective maneuverable seating areas 12 in the uniform theater configuration 11 towards the end of the show to enable the patrons to exit the maneuverable seating areas 12. It should be noted that the puzzle theater system 10 may be reconfigured into the uniform theater configuration 11 at any suitable point during the show (e.g., at an intermission, periodically throughout the course of the show)

As illustrated, the hexagon puzzle theater system 10 in FIG. 1 includes six maneuverable seating areas 12, the square puzzle theater system 10 in FIG. 2 includes four maneuverable seating areas 12, the circle puzzle theater system 10 in FIG. 3 includes four maneuverable seating areas 12, and the triangle puzzle theater system 10 in FIG. 4 includes three maneuverable seating areas 12. However, it should be understood that any suitable number (e.g., 1, 2, 3, 4, 5, 6, 7, 8, 9, 10) of maneuverable seating areas 12 be used in accordance with the present disclosure. Further, as illustrated, the maneuverable seating areas 12 are shown as completely surrounding the center platforms 14, but in some embodiments, the maneuverable seating areas 12 may only partially surround the center platform 14. For example, taking the square puzzle theater system 10 in FIG. 2 into account, in some embodiments, only the top and bottom maneuverable seating areas 12 of the square puzzle theater system 10 may be used and the left and right maneuverable seating areas 12 may be absent.

Figure 5:
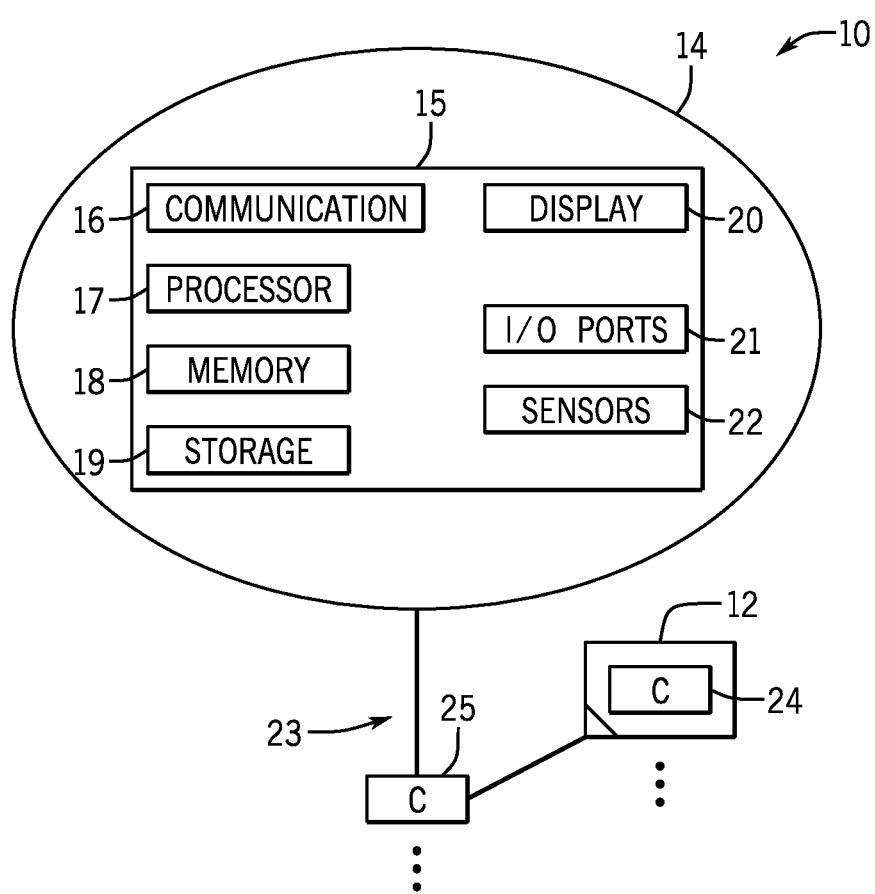
FIG. 5 is a schematic diagram of components included in the puzzle theater system, in accordance with the present disclosure.

FIG. 5 is a schematic diagram of components included in the puzzle theater system 10, in accordance with the present disclosure. As depicted and mentioned above, the puzzle theater system 10 may be a single machine with various connected parts. For example, the center platform 14 may include center platform circuitry 15 including a communication component 16, a processor 17, a memory 18, a storage 19, a display 20, input/output (I/O) ports 21, sensors 22, and the like. The center platform 14 may also include fixed props on a stage or automated props for supporting a theatrical production. The communication component 35 may be a wireless or wired communication component that may facilitate communication with the maneuverable seating area 12, a workstation monitoring the puzzle theater system 10, and/or other communication capable devices.

The processor 17 may be any type of computer processor or microprocessor capable of executing computer-executable code. The processor 17 may also include multiple processors that may perform the operations described below. The memory 18 and the storage 19 may be any suitable articles of manufacture that can serve as media to store processor-executable code, data, or the like. These articles of manufacture may represent non-transitory computer-readable media (e.g., any suitable form of memory or storage) that may store the processor-executable code used by the processor 17 to perform the presently disclosed techniques. It should be noted that non-transitory merely indicates that the media is tangible and not a signal. Generally, the processor 17 may execute code to control the actuation of one or more actuator arms 23 to move the maneuverable seating areas 12 as desired via a local (e.g., direct connection) or remote communication link to the actuator arms 23. For example, the code stored on the memory 18 and/or the storage 19 may include preconfigured actuation instructions such as how to actuate the actuator arms 23 and the times at which to actuate the arms 23. In some embodiments, the actuation instructions may be synchronized to storylines or show elements being performed on the center platform 14, input received by the patrons at the maneuverable seating areas 12, or both. Further, the processor 17 may execute code to control the operation of the center platform 14 (e.g., rotating the center platform 14). The memory 18 and the storage 19 may also be used to store the data, analysis of the data, and the like.

The I/O ports 21 may be interfaces that may couple to other peripheral components such as input devices (e.g., keyboard, mouse, display screens), sensors, input/output (I/O) modules, and the like. I/O modules may enable the center platform 14 to communicate with the actuator arms 23 and/or the maneuverable seating areas 12 or other devices via the I/O modules. For example, a technician servicing the center platform 14 may couple an electronic device to the center platform 14 via the I/O ports 21 to perform testing of the puzzle theater system 10.

The sensors 22 may include any circuitry designed to determine proximity of objects to the center platform 14. For example, the proximity sensors 22 may determine a distance between the center platform 14 and the maneuverable seating areas 12 and provide signals indicating the distance to the processor 17. The processor 17 may use the distance data to control the actuation (e.g., speed, direction) of the actuator arms to move the maneuverable seating areas 12 into different configurations. In some embodiments, the sensors 22 may include any suitable types, such as vibration, thermal, current, and the like.

The display 20 may depict video that is associated with the show being performed on the center platform 14. The video may enhance patron experience by providing visual elements that supplement the show and help conjure up a setting (e.g., displaying a waterfall, fire, storm, forest, and the like. In some embodiments, the display 20 may be located on the surface of the center platform 14 and the video may be controlled as desired to provide any suitable landscape or surface (e.g., grass, water, rocks).

Although the components described above have been discussed with regard to the center platform 14, it should be noted that similar components may make up the circuitry 24 of the maneuverable seating areas 12. For example, the display 20 included in the maneuverable seating area circuitry 24 may connect to the I/O ports 21 and show a graphical user interface (GUI) that enables a patron to make selections during the show. To illustrate, the patrons may be presented maneuverable seating area cluster configurations on the display 20 and may select the configuration as desired. In this way, the patrons may be provided an interactive experience. Further, one or more other input peripherals may be included in the maneuverable seating areas 10 that connect to the I/O ports 21 of the maneuverable seating area circuitry 24 to enable user selection of movement of the maneuverable seating area 12 and/or a show element presented. To further illustrate, in some embodiments, certain virtual prizes (e.g., virtual gold, diamonds, trophies) may be presented by a light source as hovering in the airspace inside the structure including the puzzle theater system 10 and the patrons may operate the maneuverable seating areas 12 to collect the virtual prizes. To that end, certain competitions may be enabled using the puzzle theater system 10 where the maneuverable seating area 12 that collects the most virtual prizes is deemed the winner and may receive some type of souvenir after the "show" ends. Thus, in some embodiments, the circuitry 24 of the maneuverable seating areas 12 may execute instructions to control the actuation of the actuator arms 23. Moreover, the listed components are provided as example components and the embodiments described herein are not to be limited to the components described with reference to FIG. 2.

Further, as depicted, the actuator arms 23 may be coupled to the center platform 14 and to the maneuverable seating areas 12. The actuator arms 23 may include one or more joint components 25 that enable moving the actuator arms 23 as desired. The components 25 may include stackable parts (e.g., telescoping components) that enable telescoping the actuator arms 23 to extend away from and retract closer to and/or into the center platform 14. In some embodiments, the length of extension from the center platform 14 of each actuator arm 23 may vary from one another throughout the course of the show. Further, the components 25 may include jointed parts (e.g., jointed components) that enable bending the actuator arms 23 as desired. In some embodiments, each of the actuator arms 23 may be independently controlled and bend differently than one another throughout the course of the show.

The remainder of this disclosure focuses on an embodiment including the hexagon puzzle theater system 10, but it should be borne in mind that any suitable shaped puzzle theater system 10 may be used. As such, FIG. 6 is a perspective view of an embodiment of the hexagon puzzle theater system 10 in the uniform theater configuration 11, in accordance with the present disclosure. As previously discussed, the uniform theater configuration 11 may include the maneuverable seating areas 12 being flush against the center platform 14 and immediately adjacent to each other. Each of the maneuverable seating areas 12 may include one or more seats 26 arranged in rows. Further, the rows of seats 26 may be bleacher-style where the row of seats nearest the center platform 14 is lowest and each row of seats is incrementally higher than the row of seats 26 in front of it. In some embodiments, each seat 26, row of seats 28, maneuverable seating area 12 or combination thereof may be on top of a respective motion base system that is controlled by maneuverable seating area circuitry 24 and/or center platform circuitry 15 (e.g., each seat 26 may have a specific motion base on top of a general motion base for the maneuverable seating area 12). The motion base system may enable moving the seat in desirable ways (e.g., tilting, vibrating, pitching, rolling, yawing, surging, heaving, swaying) in sync with a storyline being presented during the show, show elements, individual user input, or some combination thereof.

In some embodiments, a containment system of each seat 26 may be utilized to restrain patrons physically so that they are separated from any breakaway zones 28 when the maneuverable seating areas 12 are moved and to secure the patron while the maneuverable seating areas 12 move. This may include using at least locking lap bars, overhead locking chest bars, seat belts, or any combination thereof. Further, the breakaway zones 28 may be spaced far enough away from the patrons' seats to avoid obstructions when reconfiguring in the uniform theater configuration 11. Also, the distance between the seats 26 and the breakaway zone 28 (e.g., breakaway point) may be a sufficient distance to prevent any obstructions when arranging the maneuverable seating areas 12 together in various groupings (e.g., halves, thirds) during the course of the ride. Additionally, in some embodiments, there may be a transparent wall (e.g., acrylic glass) attached to the sides of the maneuverable seating areas 12 that raise when the maneuverable seating areas 12 begin to move to avoid obstructions when reconfiguring the maneuverable seating areas 12 in the uniform theater configuration 11 and/or to contain any loose objects within the maneuverable seating area 12 during movement.

FIGS. 7-9 include a set of perspective views of embodiments of concealing a breakaway zone 28 between adjacent maneuverable seating areas 12, in accordance with the present disclosure. It should be noted that the breakaway zones 28 between the maneuverable seating areas 12 and the center platform 14 may also be concealed using the concealment techniques described below. Concealing the breakaway zones 28 may be used between adjacent maneuverable seating areas 12 and/or between the maneuverable seating areas 12 and the center platform 14 when the puzzle theater system 10 is in the uniform theater configuration 11 to enhance the perception that the puzzle theater system 10 is a unified stationary theater. Generally, the breakaway zones 28 may be hidden through the use of patterns, indentations, lighting/shadowing, overlapping materials (e.g., carpet), and so forth, on the surfaces of maneuverable seating areas' platforms and/or the center platform 14.

With the foregoing in mind, FIG. 7 depicts maneuverable seating areas 12 arranged side-by-side relative to one another and flush against the center platform 14 in the uniform theater configuration 11. In some embodiments, a maneuverable seating area's platform surface may include lines 29, which may be rails of track lighting that create a walkway. As may be appreciated, such a walkway may resemble those typically seen in theaters. In other embodiments, the lines 29 may be indented grooves in the surface that may be darkened (e.g., with paint, shadows), deepened, and so forth. As depicted, the breakaway zone 28 between maneuverable seating areas 12 is immediately adjacent to lines 29 so the crack where the two surfaces meet may appear to be integrated with the installation of the track lighting or just another indented groove. The track lighting may be utilized to cast a shadow over the breakaway zone 28 for additional disguise. Further, the sides of the platforms may be designed to be wedged 30. The wedged platforms may fit together in a way that prevents light from emanating from the bottom of the maneuverable seating areas 12 and exposing the breakaway zone 28, among other things. Also, as discussed above, the distance between the seats 26 and the breakaway zone 28 may be a sufficient distance 32 to prevent any obstructions when arranging the maneuverable seating areas 12 and the center platform 14 together during the course of the show.

In another embodiment, FIG. 8 depicts concealing the breakaway zone 28 between the side-by-side arranged maneuverable seating areas 12 by utilizing a zig-zag pattern. The pattern may be a part of carpet installed on the surface of the maneuverable seating areas' platforms, painted on the surface of the maneuverable seating areas' platforms, indented as grooves on the surface of the maneuverable seating areas' platforms, or the like. The pattern may cover the entire platform surface or only a portion of it. The carpet or paint may use dark colors (e.g., black, gray) in order to mask the breakaway zone 28. Additionally, if the zig-zags are indented grooves, the grooves may also be darkened with paint and/or shadowing. The sides of the platforms may be designed to be zig-zagged so the corresponding teeth may interlock when arranged adjacent to other maneuverable seating areas.

In another embodiment, FIG. 9 depicts concealing the breakaway zone 28 between the side-by-side arranged maneuverable seating areas 12 by utilizing an interlocking square pattern. The pattern may be a part of carpet installed on the surface of the maneuverable seating areas' platforms, painted on the surface of the maneuverable seating areas' platforms, indented as grooves on the surface of the maneuverable seating areas' platforms, or the like. The pattern may cover the entire platform surface or only a portion of it. The carpet or paint may use dark colors (e.g., black, gray) in order to mask the breakaway zone 28. Additionally, if the interlocking squares are indented grooves, the grooves may also be darkened with paint and/or shadowing. The sides of the platforms may be designed to be interlocking squares so the corresponding teeth fit together when arranged adjacent to other maneuverable seating areas.

In yet another embodiment, the platform surface of one of the maneuverable seating areas may include a flap that extends onto an adjacent maneuverable seating area and/or the center platform 14 in order to cover the breakaway zones 28 completely. This flap may be made of carpet, rubber, and the like. It may include a pattern that blends in with a pattern included across the surfaces of the adjacently arranged maneuverable seating areas' platforms and/or the center platform 14 so that the platforms appear to be unified.

FIG. 10 is a perspective view of an embodiment of the hexagon puzzle theater system 10 of FIG. 6 in a separated configuration with actuator arms 23 extended, in accordance with the present disclosure. As illustrated, each actuator arm 23 is coupled to a side panel 36 of the center platform 14 and to a side panel 37 of the maneuverable seating area 12. As previously discussed, the center platform 14 may include center platform circuitry 15 that is configured to control the actuation of the actuator arms 23 to move the maneuverable seating areas 12 as desired. In some embodiments, the maneuverable seating areas 12 may be moved via the actuator arms 23 during the course of a show in sync with a storyline or show elements, on demand by the patrons, or the like. The actuator arms 23 may be coupled to the side panels 36 and 37 to enable the actuator arms 23 to angularly pivot to provide six degrees of freedom motion to the maneuverable seating areas 12 and/or to slide vertically and/or horizontally in the side panels 36 and 37. In the illustrated embodiment, each of the actuator arms 23 are extended straight away from the center platform 23, which may be an effect used by the puzzle theater system 10 to enhance a "blast" resulting from an explosion scene being simulated on the center platform 14 as part of the show, a repulsion spell being "cast" by an actor as part of the show, or the like.

In some embodiments, a display screen may be located on each wall behind the maneuverable seating areas 12 and may display video (e.g., effects, scenery, movie) that corresponds to a storyline of the show being presented on the center platform 14 (e.g., stage) to provide additional content during the show to patrons sitting around the respective maneuverable seating areas 12. Additionally or alternatively, one or more displays 20 may be included in the center platform 14 and/or the maneuverable seating areas 12, as previously discussed.

It should be understood that, in some embodiments, the center platform 14 may be disposed on a turntable configured to circularly rotate the maneuverable seating areas 12 attached to the actuator arms 23 as desired (e.g., left or right). The speed of the rotation may be controlled by the center platform circuitry 15. In some embodiments, a surface 38 of the center platform 14 may rotate with the center platform 14 on the turntable. However, in some embodiments, the surface 38 may remain stationary as the panels 36 of the center platform 14 are circularly rotated. As a result, the patrons in the rotating maneuverable seating areas 12 may receive diversified point-of-views throughout the show.

FIG. 11 is a perspective view of an embodiment of the hexagon puzzle show theater 10 of FIG. 6 in a separated configuration with the actuator arms 23 extended and the maneuverable seating areas 12 horizontally rotated into an arrangement of thirds 40, 42, and 44, in accordance with the present disclosure. As depicted, each third 40, 42, and 44 includes two maneuverable seating areas 12 adjacently arranged next to one another. The center platform circuitry 15 may cause the actuator arms 23 to extend and to slide horizontally in the side panels 36 and 37 and/or angularly pivot in the side panels 36 and 37 to move the maneuverable seating areas 12 of the respective third 40, 42, and 44 into the adjacent positions. In some embodiments, the actuator arms 23 of one side panel 36 may slide onto an adjacent side panel 36 of the center platform 14 so two actuator arms 23 protrude from the same side panel 36. When the actuator arms 23 are refracted (e.g., to return to the uniform theater configuration 11), an actuator arm 23 may be actuated over to its original side panel 36 on the center platform 14.

As briefly discussed above, in some embodiments, one or more proximity sensors 22 may be part of the maneuverable seating area circuitry 24 and disposed on the maneuverable seating areas 12. The sensors 22 may transmit signals to a processor 17 of the maneuverable seating area circuitry 24 and/or the center platform circuitry 15. The sensor signals may indicate that objects (e.g., other maneuverable seating areas 12) are proximate to the sensors 22, and the signals may also indicate the distance between the proximate objects and the sensors 22. Based on the sensor signals, the maneuverable seating area circuitry 24 and/or the center platform circuitry 15 may command the actuator arms 23 to control the movement speed of the actuator arms 23 (e.g., increase or decrease the movement speed, stop movement). For example, as the maneuverable seating areas 12 are rotated closer together according to the sensor signals, the movement speed of the actuator arms 23 may be reduced to enable gradually arranging the maneuverable seating areas 12 of the respective third 40, 42, and 44 proximate to one another within a threshold distance (e.g., one inch to one foot, one foot to two feet).

FIG. 12 is a perspective view of an embodiment of the hexagon puzzle theater system 10 of FIG. 6 in a separated configuration with the maneuverable seating areas 12 extended into an arrangement of halves 46 and 48, in accordance with the present disclosure. As depicted, each half 46 and 48 includes three maneuverable seating areas 12 adjacently arranged next to one another. To enable the maneuverable seating areas 12 to be arranged in halves 46 and 48, the center platform circuitry 15 may cause the actuator arms 23 to extend and to horizontally slide and/or angularly pivot in the side panels 36 and 37 of the center platform 14 and/or the maneuverable seating area 12, respectively. As briefly discussed above, the maneuverable seating areas 12 may be brought within a threshold distance (e.g., one inch to one foot, one foot to two feet, two feet to three feet) from each other before the center platform circuitry commands the actuator arms 23 to stop. In some embodiments, signals from the proximity sensors 22 may be used by the maneuverable seating area circuitry 24 and/or the center platform circuitry 15 to determine the proximity of the maneuverable seating areas 12 to one another while the actuator arms 23 are moving the maneuverable seating areas 12 into halves 46 and 48. It should be understood that, in some embodiments, the center platform 14 may rotate the puzzle theater system 10 as desired (e.g., left or right) while the maneuverable seating areas 12 are arranged in halves 46 and 48.

It should also be understood, that, in some embodiments, the center platform circuitry 15 may stop the center platform's rotation at a certain point so the maneuverable seating areas 12 are in different positions from where they originated. That is, the maneuverable seating areas 12 can begin and end in a different physical space around the center platform 14, thereby providing patrons a changing point-of-view throughout the show. At the end of the show, actuator arms 23 may be retracted to bring the maneuverable seating areas back to the uniform theater configuration 11.

FIG. 13 is a perspective view of an embodiment of the hexagon puzzle theater system 10 of FIG. 6 in a separated configuration with some of the actuator arms 23 raised, in accordance with the present disclosure. As depicted, three maneuverable seating areas 12, 50 are raised to a higher elevation than the other three maneuverable seating areas 12, 52. To enable raising the maneuverable seating areas 50, the actuator arms 23 may be configured to angularly pivot upward in the side panel 36 of the center platform 14 and to angularly pivot downward in the side panel 37 of the maneuverable seating areas 50. Angularly pivoting the actuator arms 23 downward in the side panels 37 of the maneuverable seating area 50 may enable maintaining a level orientation of the surface of the maneuverable seating areas 50 as the maneuverable seating area 50 is raised. Although the maneuverable seating areas 50 are shown raised to a certain height, it should be understood that the actuator arms 23 are configured to lift the maneuverable seating areas 12 to any height within the actuator arms' range of motion. For example, in some embodiments, the center platform circuitry 15 may cause the actuator arms 23 to angularly pivot upward in the side panel 36 of the center platform 14 until the actuator arms 23 are relatively perpendicular to a surface 54 on which the puzzle theater system 10 resides. In an embodiment, when all six of the actuator arms 23 are relatively perpendicular to the surface 54 (e.g. nearly straight up), the maneuverable seating areas 12 may be arranged adjacently to one another (e.g., forming a hexagon) at a configurable height above the center platform 14.

Further, in some embodiments, the center platform circuitry 15 may cause the actuator arms 23 to tilt the respective maneuverable seating areas 12 by rotating the maneuverable seating areas 12 around a lateral 56 or longitudinal 58 axis. Tilting the maneuverable seating areas 12 may enhance the patrons experience during the show. For example, in a show that includes a car chase scene, the maneuverable seating areas 12 may be tilted left or right in sync with the direction that a particular vehicle is steering to simulate that the maneuverable seating areas 12 are moving with the vehicle. As should be appreciated, the maneuverable seating areas 12 may react in any suitable manner to show elements presented on the center platform 14, displays 20 of the center platform circuitry 15 and/or maneuverable seating area circuitry 24, and the like.

FIG. 14 is a perspective view of an embodiment of the hexagon puzzle theater system 10 of FIG. 6 including two center platforms 14 (60 and 62), in accordance with the present disclosure. It should be noted that the depicted embodiment of the puzzle theater system 10 including the two center platforms 60 and 62, actuator arms 23, and maneuverable seating areas 12 is a single connected system. It should also be noted that a first center platform 60 and a second center platform 62 may be referred to as a first section and a second section, respectively, of the single connected system. As used herein, the single connected system may be referred to as a center platform including a first section and a second section. As depicted, a first center platform 60 (e.g., first section) may be disposed above a second center platform 62 (e.g., second section). Both center platforms 60 and 62 may include center platform circuitry 15. In some embodiments, one center platform circuitry 15 may be designated as the master controller and the other center platform circuitry 15 may be designated as a slave controller that is controlled by the master controller. For example, the slave controller may control actuation of the actuation arms 23 attached to its center platform 14 based on commands received from the master controller. However, in other embodiments, only one of the center platforms 14 may include center platform circuitry 15 that is configured to control actuation of both center platforms' actuator arms 23 and movement of the center platforms 60 and 62.

In the illustrated embodiment, the first center platform 60 includes three actuator arms 23 that are coupled to three respective side panels 36 of the first center platform 60 and that are also coupled to three respective maneuverable seating areas 12, 64. Additionally, the second center platform 62 includes three actuator arms 23 that are coupled to three respective side panels 36 of the second center platform 62 and that are also coupled to three respective maneuverable seating areas 12, 66. As depicted, the actuator arms 23 are extended away from the first and second center platforms 60 and 62. Further, the three actuator arms 23 attached to the first upper center platform 60 are pivoted upward (e.g., raised) to hold the respective maneuverable seating areas 64 at a higher elevation than the maneuverable seating areas 66 attached to the actuator arms 23 of the second lower center platform 62. In some embodiments, the actuator arms 23 of the second center platform 62 may be lowered so that the maneuverable seating areas 66 are held at a lower height than the maneuverable seating areas 64 attached to the first center platform 60.

Such a configuration of maneuverable seating areas 12 may enable rotating the two center platforms 60 and 62 so the maneuverable seating areas 64 of the first upper center platform 60 pass over the maneuverable seating areas 66 of the second lower center platform 62, as illustrated in FIG. 15. In some embodiments, to enable the maneuverable seating areas 64 to pass over the maneuverable seating areas 66, the two center platforms 60 and 62 may be controlled independently by the center platform circuitry 15. For example, the center platform circuitry 15 may cause the second lower center platform 62 to remain stationary while circularly rotating the first upper center platform 60, thereby moving the connected actuator arms 23 and respective maneuverable seating areas 64 over the stationary maneuverable seating areas 66. Additionally, both center platforms 60 and 62 may rotate in opposite directions so the maneuverable seating areas 64 pass over the maneuverable seating areas 66, or the center platforms 60 and 62 may rotate in the same direction but at different speeds so the maneuverable seating areas 64 pass over the maneuverable seating areas 66. Also, the maneuverable seating areas 66 may pass under the maneuverable seating areas 64 by maintaining the maneuverable seating areas 64 in a stationary position while rotating the second lower center platform 62 to move the maneuverable seating areas 66 under the maneuverable seating areas 64.

FIG. 16 is a side view of an embodiment of the hexagon puzzle theater system 10 including the two center rotating platforms 60 and 62 of FIG. 14 illustrating the maneuverable seating areas 12, 64 and 12, 66 flush with the top center platform 60 in the uniform theater configuration 11, and FIG. 17 is a side view of an embodiment of the hexagon puzzle theater system 10 including the two center rotating platforms 60 and 62 of FIG. 14 illustrating a separated configuration with the actuator arms 23 extended, in accordance with the present disclosure. As depicted in FIG. 16, to enable the maneuverable seating areas 64 and 66 to be arranged in the uniform theater configuration 11, the actuator arm 23 attached to the lower center platform 62 may be bent upward at the jointed component 25 and partially retracted into slot 70. Also, as depicted, the actuator arms that are connected to the lower center platform 62 may be connected to the bottom of the respective maneuverable seating areas 66 to enable bringing the maneuverable seating areas flush against the top center platform 60 in the uniform theater configuration 11. In contrast, in some embodiments, the actuator arms attached to the top center platform 60 may connect to the side panels 37 of the respective maneuverable seating areas 64. The actuator arms 23 may be fully retracted into their respective slots 70 when the maneuverable seating areas 64 are flush against the top center platform 60 when in the uniform theater configuration 11.

Once the show starts and movement of the maneuverable seating areas 64 and 66 is desired, the center platform circuitry 15 may cause the actuator arms 23 to extend from the slots 70, as shown in FIG. 17. The actuator arms 23 may be angularly pivoted and/or horizontally/vertically slid in the side panels 36 and/or 37 of the center platforms 60 and 62 and/or the maneuverable seating areas 64 and 66. Further, as previously discussed the jointed component 25 may be used to bend the actuator arms 23 in order to raise or lower the maneuverable seating areas 64 and 66. In the depicted embodiment, the maneuverable seating areas 12 are at relatively the same height as one another. While at the same height or within a threshold height differential, the center platforms 60 and 62 may be rotated in the same direction at the same speed to circulate the maneuverable seating areas 64 and 66 around the top center platform 60 so the patrons may receive a differing point-of-view during the course of a show.

In some embodiments, the center platform circuitry 15 may verify that the actuator arms 23 are extended a threshold distance away from the center platforms 60 and 62 and/or are angled/bent by a threshold degree so the raised maneuverable seating areas 64 have a sufficient distance between the lowered maneuverable seating areas 66 before rotating either or both of the center platforms 60 and 62. Although the depicted embodiment shows two center platforms 14 being used, it should be understood that the disclosed techniques may enable using any number of center platforms 14. For example, three center platforms 14 may be used, each having two actuator arms 23 connected to a respective center platform 14.

FIG. 18 illustrates the maneuverable seating areas 12 in a first physical location in the uniform theater configuration 11 at the start of a show and FIG. 19 illustrates the maneuverable seating areas 12 in a second physical location and each adjacent to at least one different maneuverable seating area 12 relative to the first uniform theater configuration 11 in a second uniform theater configuration at the end of the show, in accordance with the present disclosure. The rearrangement of positions of the maneuverable seating areas 12 in the uniform theater configuration 11 may at least in part be enabled by using more than one center platform 14. For example, in FIGS. 18 and 19, maneuverable seating areas 72, 73, and 74 may be attached via actuator arms 23 to the lower center platform 62 (not shown), and the maneuverable seating areas 75, 76, and 77 may be attached via actuator arms 23 to the upper center platform 60.

During the show, the actuator arms 23 of the upper center platform 60 and the lower center platform 62 may extend to move the maneuverable seating areas away from the center platform. Further, the actuator arms 23 of the upper center platform 60 may angularly pivot at the side panels 36 and/or 37 and/or bend via jointed component 25 to raise the maneuverable seating areas 75, 76, and 77 to a desired height. Also, the actuator arms 23 of the lower center platform 62 may angularly pivot at the side panels 36 and/or 37 and/or bend via jointed component 25 to lower the maneuverable seating areas 75, 76, and 77 to a desired height. Once a threshold distance between the maneuverable seating areas 75, 76, 77 and 72, 73, 74 has been obtained, the center platforms 60 and/or 62 may rotate to move the maneuverable seating areas in a circle. At the end of the show or at any time during the show, the maneuverable seating areas may be raised/lowered via the actuator arms 23 and retracted to be flush with the upper center platform 60 in different positions than where the maneuverable seating areas originally started in the uniform theater configuration 11.

To illustrate, FIG. 18 illustrates the maneuverable seating areas 72, 73, and 74 in between maneuverable seating areas 75, 76, and 77 in a first order. For example, maneuverable seating area 72 is adjacent to maneuverable seating areas 75 and 76 and maneuverable seating area 72 is positioned at an upper left side of the hexagon puzzle theater 10. FIG. 19 shows the uniform theater configuration 11 including the maneuverable seating areas rearranged in a different order than in FIG. 18 as a result of the actuation of the actuator arms 23 and rotation of the center platforms 60 and 62 during the course of the show. In FIG. 19, each of the maneuverable seating areas is next to at least one different maneuverable seating area and they are all located in different positions around the center platform 60 than where they each started in FIG. 18. For example, maneuverable seating area 72 is adjacent to maneuverable seating areas 77 and 76 and is now located on the lower left side of the hexagon puzzle theater 10. In other words, the puzzle pieces (e.g., maneuverable seating areas 10) of the puzzle theater system 10 may start in certain positions in the uniform theater configuration 11, as shown in FIG. 18. Then, the puzzle pieces may be moved, rotated, and/or shuffled during the course of the show and put back together in the same or different order, as shown in FIG. 19. The reconfiguration may at least in part be enabled by the maneuverable seating areas 12 sharing a uniform shape so they can be interchangeably arranged. Accordingly, patrons may receive different experiences based on which maneuverable seating area 12 they sit, thereby encouraging re-ridability. Also, the patrons' point-of-views may change throughout the course of the show, which may enhance the enjoyment of the show being performed or interactively played.

FIG. 20 is a flow diagram of an embodiment of a process 80 suitable for configuring movement and an arrangement of the maneuverable seating areas 12 during a show, in accordance with the present disclosure. The method 80 may be implemented as computer instructions stored on the one or more tangible, non-transitory computer-readable medias (e.g., memories 18) and executable by the one or more processors 17. Although the following description of the method 80 is described with reference to the processor 17 (e.g., one or more processors) of the center platform circuitry 15, it should be noted that the method 80 may be performed by other processors disposed in other center platform circuitry 15 (e.g., when more than one center platform 14 are used) or elsewhere. Additionally, although the following method 80 describes a number of operations that may be performed, it should be noted that the method 80 may be performed in a variety of suitable orders and all of the operations may not be performed. The method 80 may include determining a configuration of maneuverable seating areas 12 (block 82), determining movement of the maneuverable seating areas 12 to enable the configuration (block 84), and performing actuation of the actuator arms 23 to enable the movement and configuration (block 86).

For example, the processor 17 may determine the configuration includes arranging the maneuverable seating areas 12 in isolation, halves, thirds, uniform theater configuration 11, a raised hexagon, or the like throughout the course of the show (block 82). Then, the processor 17 may determine the movements of the actuator arms 23 to enable the configuration. That is, the processor 17 may determine whether to extend/retract, raise/lower, pivot, or the like, certain actuator arms 23 based on where each respective maneuverable seating area 12 is positioned in the configuration (block 84). Then, the processor 17 may perform the actuation of the actuator arms 23 to enable the configuration of the maneuverable seating areas 12 as desired (block 86).

In some embodiments, the configuration of maneuverable seating areas 12 may be preconfigured according to a script that is synchronized with storylines or show elements of the show being performed and the movement of the actuator arms 23 may be preconfigured to enable the configurations. As a result, the processor 17 may execute the script based on a trigger (e.g., a start time for the show). Additionally, in some embodiments, the configuration and/or movement of maneuverable seating areas may be dynamically determined by the processor 17 based on patron input during the course of the show.

While only certain features of the present disclosure have been illustrated and described herein, many modifications and changes will occur to those skilled in the art. It is, therefore, to be understood that the appended claims are intended to cover all such modifications and changes as fall within the true spirit of the disclosure.

The invention claimed is:

1. A theater ride system, comprising:
a processor;
a center platform;
a plurality of actuator arms;
a plurality of maneuverable seating areas, wherein each maneuverable seating area of at least a first subset of the plurality of maneuverable seating areas is coupled to a respective portion of the center platform via a respective actuator arm of the plurality of actuator arms;
wherein the processor is configured to control the plurality of actuator arms to:
position the plurality of maneuverable seating areas in a uniform theater configuration such that each of the plurality of maneuverable seating areas is adjacent to at least one other of the plurality of maneuverable seating areas and the center platform to resemble stationary seating sections of a theater at a beginning of a show;
move the plurality of maneuverable seating areas into different configurations during the show; and
position the plurality of maneuverable seating areas in the uniform theater configuration near an end of the show.

2. The theater ride system of claim 1, comprising an additional center platform disposed beneath the center platform, wherein each maneuverable seating area of at least a second subset of the plurality of maneuverable seating areas is coupled to a respective portion of the additional center platform via an actuator arm.

3. The theater ride system of claim 2, wherein the processor is configured to control the actuator arms of the center platform and the additional center platform to extend the first and second subsets of the plurality of maneuverable seating areas away from the center platform and the additional center platform, to lower the second subset to a height lower than the first subset, and to rotate the center platform, the additional center platform, or both to move the first subset over the second subset, the second subset under the first subset, or both during a course of operations.

4. The theater ride system of claim 1, wherein the plurality of maneuverable seating areas are arranged in different positions around the center platform in the uniform theater configuration at the end of the show than the uniform theater configuration at the beginning of the show.

5. The theater ride system of claim 1, wherein the actuator arms are configured to move the plurality of maneuverable seating areas into the different configurations by extending and retracting via a telescoping component, bending via a jointed component, pivoting in the respective side panel of the center platform or the respective maneuverable seating area, sliding vertically, horizontally, or both in the respective side panel of the center platform or the respective maneuverable seating area, or some combination thereof.

6. The theater ride system of claim 1, wherein the center platform is configured to rotate clockwise or counterclockwise.

7. The theater ride system of claim 1, wherein the processor is configured to control the actuator arms to tilt the maneuverable seating areas.

8. The theater ride system of claim 1, wherein the respective portions are side panels of the center platform and wherein a surface of the center platform is used to perform the show and the surface is configured to remain stationary as the side panels coupled to the actuator arms rotate during the show.

9. The theater ride system of claim 1, wherein the different configurations comprise:
half of the plurality of maneuverable seating areas arranged adjacent to one another in a first grouping and half of the plurality of maneuverable seating areas arranged adjacent to one another in a second grouping;

one third of the plurality of maneuverable seating areas arranged adjacent to one another in a first grouping, one third of the plurality of maneuverable seating areas arranged adjacent to one another in a second grouping, and one third of the plurality of maneuverable seating areas arranged adjacent to one another in a third grouping; or each of the plurality of maneuverable seating areas isolated from each other by being spaced apart.

10. The theater ride system of claim 1, wherein the center platform is hexagon shaped, square shaped, circular shaped, or triangle shaped.

11. The theater ride system of claim 1, wherein the processor is configured to control the actuator arms to move the plurality of maneuverable seating areas into different configurations during the show in synchronization with a storyline of the show, show elements of the show, user input received via the plurality of maneuverable seating areas, or some combination thereof.

12. The theater ride system of claim 1, wherein the plurality of maneuverable seating areas are positioned in the uniform theater configuration at the beginning of the show such that each of the plurality of maneuverable seating areas is touching at least one other of the plurality of maneuverable seating areas and the platform to resemble stationary seating sections of the theater.

13. A theater ride system, comprising:
a processor;
a plurality of maneuverable seating areas; and
a center platform comprising a plurality of actuator arms each coupled to a respective maneuverable seating area of the plurality of maneuverable seating areas and the center platform;
wherein the processor is configured to direct the system to:
position, via the plurality of actuator arms, the maneuverable seating areas in a uniform theater configuration adjacent to at least one other maneuverable seating area and the center platform to resemble stationary seating sections of a theater at a beginning of a show;
move, via the plurality of actuator arms, the maneuverable seating areas into different configurations during the show; and
position, via the plurality of actuator arms, the maneuverable seating areas in the uniform theater configuration near an end of the show.

14. The theater ride system of claim 13, wherein the center platform comprises a first section disposed above a second section, wherein a first subset of the plurality of actuator arms is coupled to the first section and a second subset of the plurality of actuator arms is coupled to the second section.

15. The theater ride system of claim 14, wherein the processor is configured to control the first subset to move the coupled maneuverable seating areas away from the center platform at a first height, to control the second subset to move the coupled maneuverable seating areas away from the center platform at a second height, lower than the first height.

16. The theater ride system of claim 15, configured to rotate the first section to move the maneuverable seating areas coupled to the first section over the maneuverable seating areas coupled to the second section or to rotate the second section to move the maneuverable seating areas coupled to the second section under the maneuverable seating areas coupled to the first section.

17. The theater ride system of claim 13, wherein the different configurations comprise:
half of the plurality of maneuverable seating areas arranged adjacent to one another in a first grouping and half of the plurality of maneuverable seating areas arranged adjacent to one another in a second grouping;

one third of the plurality of maneuverable seating areas arranged adjacent to one another in a first grouping, one third of the plurality of maneuverable seating areas arranged adjacent to one another in a second grouping, and one third of the plurality of maneuverable seating areas arranged adjacent to one another in a third grouping; or each of the plurality of maneuverable seating areas isolated from each other by being spaced apart.

18. A puzzle theater system, comprising:
a processor;
a plurality of maneuverable seating areas;
a first center platform;
a first plurality of actuator arms each coupled to a respective maneuverable seating area of a first subset of the plurality of maneuverable seating areas and the first center platform;
a second center platform;
a second plurality of actuator arms each coupled to a respective maneuverable seating area of a second subset of the plurality of maneuverable seating areas and the second center platform, wherein the first center platform is disposed on top of the second center platform, and the processor is configured to direct the system to:
position, via the first and second pluralities of actuator arms, the plurality of maneuverable seating areas in a uniform theater configuration such that each of the plurality of maneuverable seating areas is adjacent to at least one other of the plurality of maneuverable seating areas and the first center platform to resemble stationary seating sections of a theater at a beginning of a show;
move, via the first and second pluralities of actuator arms, the plurality of maneuverable seating areas into different configurations during the show; and
position, via the first and second pluralities of actuator arms, the maneuverable seating areas in the uniform theater configuration near an end of the show.

19. The theater ride system of claim 18, wherein breakaway zones between the plurality of maneuverable seating areas and between the plurality of vehicles and the first center platform are concealed when in the uniform theater configuration at the beginning of the show.

20. The theater ride system of claim 18, wherein the plurality of maneuverable seating areas are arranged in different positions in the uniform theater configuration at the end of the show than in the uniform theater configuration at the beginning of the show as a result of movement of the maneuverable seating areas via the first and second pluralities of actuator arms and rotation of the first and second center platforms during the show.

21. The theater ride system of claim 18, wherein the plurality of maneuverable seating areas are arranged in the same positions in the uniform theater configuration at the end of the show as in the uniform theater configuration at the beginning of the show.

* * * * *